UNITED STATES PATENT OFFICE.

HEINRICH BAUM, OF HÖCHST-ON-THE-MAIN, GERMANY, ASSIGNOR TO FARBWERKE, VORMALS MEISTER, LUCIUS & BRÜNING, OF SAME PLACE.

DYE-STUFF OR COLORING-MATTER.

SPECIFICATION forming part of Letters Patent No. 251,164, dated December 20, 1881.

Application filed November 2, 1881. (Specimens.)

*To all whom it may concern:*

Be it known that I, HEINRICH BAUM, a citizen of Germany, residing at Höchst-on-the-Main, Germany, have invented new and useful Improvements in Dye-Stuffs or Coloring-Matters, of which the following is a specification.

The object of my invention is the production of a claret-red dye-stuff or coloring-matter from a mixture of the two disulpho-betanaphtholic sodium salts by means of the diazo compound derived from naphthylamine.

To produce the disulpho-betanaphtholic acids, one part of beta-naphthol is mixed with three parts of sulphuric acid, the mixture being heated for twelve hours at a temperature of 212° to 230° Fahrenheit. Two isomere disulpho-betanaphtholic acids are thereby obtained. Of their soda salts one is soluble in alcohol and the other is not. A mixture of these two s da salts is used for producing the coloring-matter being the object of this invention.

To obtain the coloring-matter, six and one-half parts of naphthylamine are dissolved in twelve parts of muriatic acid (specific gravity 1.16 to 1.18) and one hundred parts of water, to which are added four and one-half parts of pure nitrite of potash. This solution is poured into twenty pounds of the above-described mixture of disulpho-betanaphtholic sodium salts dissolved in two hundred parts of water and ten parts of ammonia, (ten per cent.,) when the coloring-matter precipitates in the form of a paste. This paste is dissolved, precipitated with common salt, and dried. A powder is thereby obtained which will dye wool or silk with a claret-red shade that will stand light and soaping.

My coloring-matter dissolves in concentrated sulphuric acid with a greenish color.

By heating the coloring-matter with tin and muriatic acid a white precipitate is obtained which contains hydrochlorate of naphthylamine and beta-amido naphthol disulpho-acid. It differs from the coloring-matter described in Caro's patent, Reissue No. 9,144, dated April 6, 1880, since Caro's coloring-matter dissolves in sulphuric acid with a violet color, and when treated with tin and muriatic acid the precipitate of Caro's coloring-matter contains hydrochlorate of beta-naphthol and naphthylamine sulpho-acid.

I do not limit myself to the exact proportions, as they may be varied without departing from the principle of my invention.

What I claim as new, and desire to secure by Letters Patent, is—

1. As a new article of manufacture, the claret-red dye-stuff or coloring-matter having the characteristics above stated.

2. The within-described process for producing a dye-stuff or coloring-matter by the reaction of a mixture of the two disulpho-betanaphtholic sodium salts upon the diazoic derivative of naphthylamine, substantially as set forth.

In testimony whereof I have hereunto set my hand and seal in the presence of two subscribing witnesses.

HEINRICH BAUM. [L. S.]

Witnesses:
FERDINAND VOGELER,
GOTTFRIED RADERMACHER.